United States Patent
Viswanathan et al.

(10) Patent No.: US 9,703,641 B1
(45) Date of Patent: Jul. 11, 2017

(54) UNIFIED PROTECTION OF CLUSTER SUITE

(71) Applicant: EMC IP Holding Company LLC, Hopkinton, MA (US)

(72) Inventors: Sathyamoorthy Viswanathan, Tamil Nadu (IN); Kishore Kumar, Bangalore (IN); Ajith Gopinath, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/752,404

(22) Filed: Jun. 26, 2015

(51) Int. Cl.
  *G06F 11/00* (2006.01)
  *G06F 11/14* (2006.01)

(52) U.S. Cl.
  CPC ...... *G06F 11/1451* (2013.01); *G06F 11/1464* (2013.01); *G06F 11/1469* (2013.01); *G06F 2201/815* (2013.01); *G06F 2201/84* (2013.01)

(58) Field of Classification Search
  CPC ............ G06F 11/1451; G06F 11/1464; G06F 11/1456; G06F 11/1469; G06F 11/1458; G06F 11/2097; G06F 11/1425; G06F 11/1484; G06F 2201/84
  See application file for complete search history.

(56) References Cited

U.S. PATENT DOCUMENTS

| 8,769,226 | B2* | 7/2014 | Wilk ................... G06F 11/1464 707/640 |
| 9,201,887 | B1* | 12/2015 | Earl ................. G06F 17/30088 |
| 9,396,071 | B1* | 7/2016 | Akanda ............... G06F 9/45533 |
| 9,398,092 | B1* | 7/2016 | Singhal ............... H04L 67/1097 |
| 2014/0325267 | A1* | 10/2014 | Liu ....................... G06F 3/0482 714/15 |
| 2015/0033133 | A1* | 1/2015 | Thakur ................ G06F 3/0647 715/735 |

\* cited by examiner

*Primary Examiner* — Nadeem Iqbal
(74) *Attorney, Agent, or Firm* — Van Pelt, Yi & James LLP

(57) ABSTRACT

Techniques to back up data associated with a cluster environment are disclosed. In various embodiments, an indication is received to back up data associated with the cluster. A backup configuration data associated with the cluster is used to back up, in a unified backup operation, one or more save sets associated with virtual resources associated with the cluster and one or more saves sets associated with physical nodes associated with the cluster, including by storing each respective save set in a manner that associates the save set with a virtual or physical node comprising the cluster suite.

17 Claims, 7 Drawing Sheets

UNIFIED PROTECTION OF CLUSTER SUITE

BACKGROUND OF THE INVENTION

Cluster technologies have been provided to associate physical nodes, such as servers, together in a cluster. Applications and services running on the cluster may be configured to fail over gracefully using functionality made available via the cluster technology. One example of such cluster technology is Microsoft® Cluster Services (MSCS). Cluster nodes may have shared access to resources used to provide access to applications and services, such as a cluster shared volume (CSV) or other shared drive/storage. Virtualization technologies, e.g., virtual machines, may be used to provide access to applications and/or services via a cluster.

A current method of protecting (backing up data on) a cluster is to back up the physical and virtual machines individually. A backup administrator has to create individual client resources for both virtual clients and physical cluster nodes. All these individual cluster nodes may need to be added to a 'Remote Access' section of the virtual client resource. This way of configuring the cluster clients is tedious and time consuming for medium and large sized cluster environments. In addition, physical nodes may end up getting backed up on a different schedule that virtual resources, which may complicate recovery from a catastrophic failure.

BRIEF DESCRIPTION OF THE DRAWINGS

Various embodiments of the invention are disclosed in the following detailed description and the accompanying drawings.

DETAILED DESCRIPTION

Figure 1:
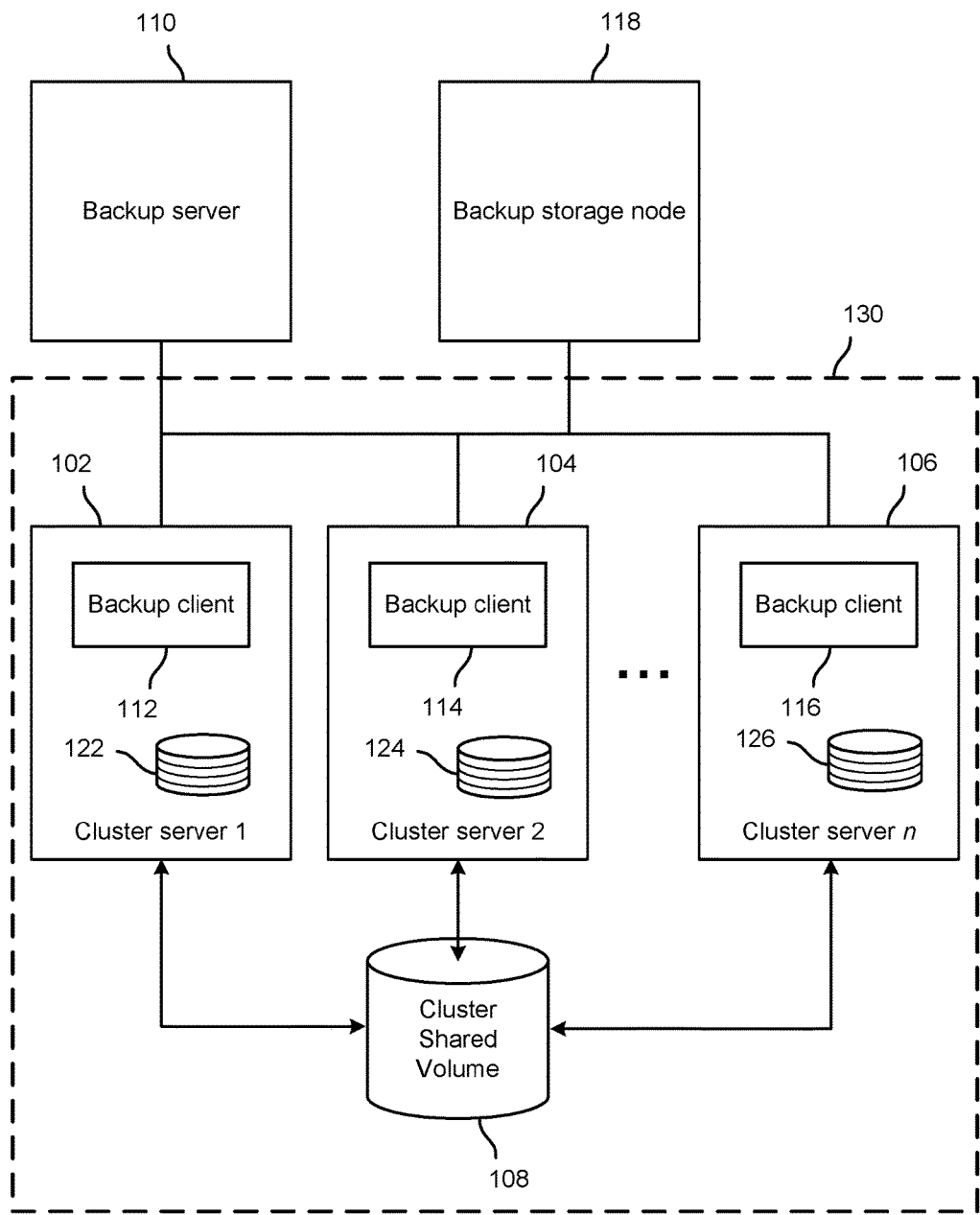
FIG. 1 is a block diagram illustrating an embodiment of a system to perform unified back up of a suite.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing a single, unified backup for an entire cluster suite is disclosed. In various embodiments, the creation of cluster resources is simplified. Simplification of the creation of the cluster resources is achieved in some embodiments by having a common client resource for both virtual client as well as physical nodes. While creating the backup client resource for the cluster virtual client, in some embodiments, the administrator can utilize the failover cluster API's to automatically detect the physical clients in the cluster. In some embodiments, physical clients may be added manually. In some embodiments, the save set for backup would default to 'All', i.e., all save sets on all virtual and physical nodes in the cluster. In various embodiments, this default setting would result in all the shared volumes for the virtual client resource and all volumes belonging to individual physical nodes being backed up in a single, unified operation.

In various embodiments, save sets are prefixed with virtual and physical node names, as applicable, and the backup is indexed based on this prefix value. Using the prefix value in this way enables individual save sets to be restored. For example, if a single physical node in the cluster needed a save set (e.g., a volume) restored, the prefix for that physical node could be used to find and restore just that save set.

FIG. 1 is a block diagram illustrating an embodiment of a system to perform unified back up of a suite. In the example shown, a cluster that includes a plurality of cluster servers 1 through n, represented in FIG. 1 by cluster servers 102, 104, and 106, has shared access to a cluster shared volume (CSV) 108. In addition, in the example shown, each of the cluster servers 102, 104, and 106 includes a hard disk drive or other physical drive 122, 124, and 126, respectively. Each of the cluster servers 102, 104, and 106, for example, may have one or more volumes or other logical sets of data stored on physical drives 122, 124, and/or 126, respectively.

A backup server 110 is configured to backup up data associated with cluster servers 102, 104, and 106, including in this example data associated with CSV volume 108 and volumes stored by cluster servers such as cluster servers 102, 104, and 106 on physical drive 122, 124, and 126, respectively. The backup server 110, e.g., an EMC® Networker® backup server, is configured to use backup clients 112, 114, and 116 on each cluster server (102, 104, 106) to perform backup operations on and/or using that server. Under control and coordination of backup server 110, for example, the backup clients 112, 114, 116 may be directed to send backup data, via one or more "saveset" backup streams, to backup storage node 118. In various embodiments, a "saveset" may comprise one or more volumes and/or other defined sets of data that the backup system, including backup server 110 and backup clients 112, 114, 116, may be configured to back up as a set.

In the example shown, a single virtual backup client context 130 is defined, e.g., at backup server 110, and used to configure the backup server 110 to perform a unified backup of the cluster suite shown in FIG. 1, as disclosed herein.

As noted above, in prior approaches a virtual or other backup client may have been used to back up a volume shared by the cluster nodes, e.g., cluster shared volume (CSV) 108 shared by cluster servers 102, 104, and 106 in this example, separately from any backup of the physical nodes themselves, e.g., volumes stored on physical drives 122, 124, and/or 126. However, backing up physical resources separately from shared (virtual) resources may result in inefficiencies and mismatches (e.g., virtual backup performed at a different time the backup of physical node). Therefore, in various embodiments, a unified backup is performed for an entire cluster suite. For example, in the example shown in FIG. 1, a virtual/shared resource associated with the cluster shown, i.e., cluster shared volume 108, may be backed up in a single, unified operation along with volumes store on physical nodes such as cluster servers 102, 104, and 106.

While a single cluster shared volume 108 is shown in FIG. 1, in various embodiments, the system of FIG. 1 may include a plurality of "m" CSV volumes associated with the cluster servers 1 to n. Each server in the cluster may have shared access to each CSV volume associated with the cluster. For example, each server in the cluster may have access to read from and write to each of the CSV volumes.

Figure 2:
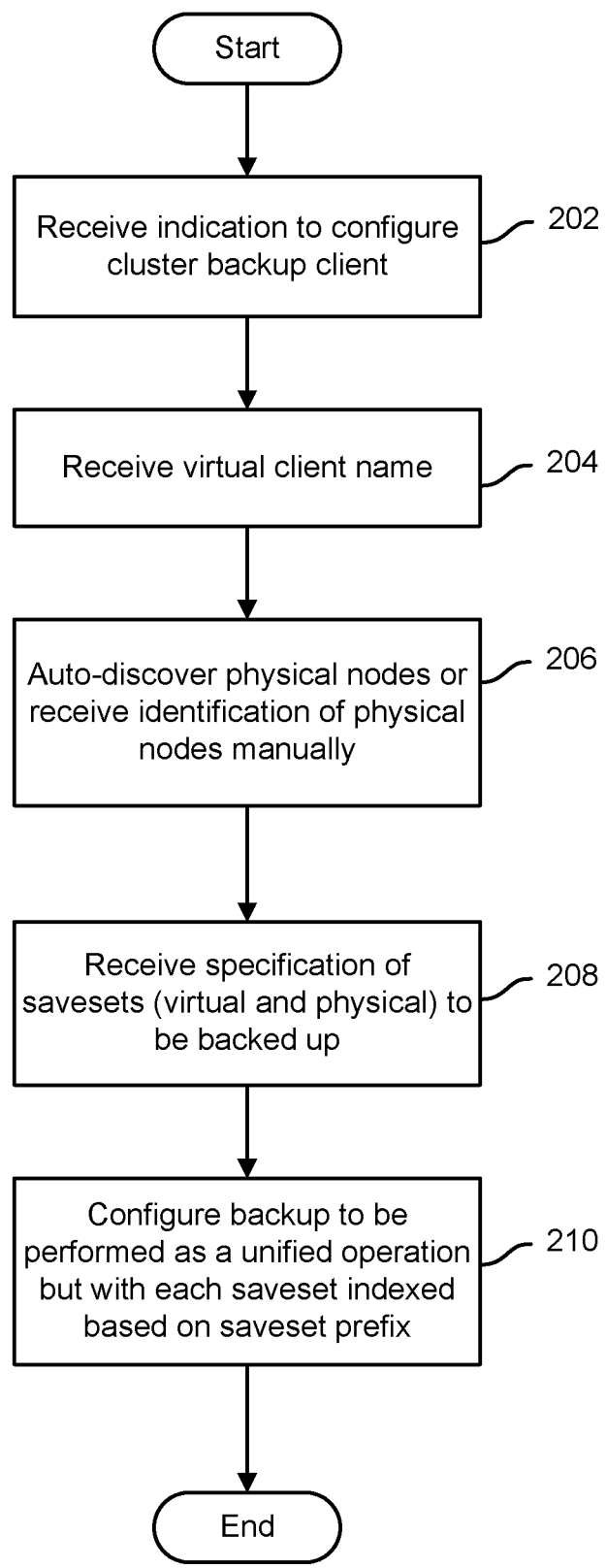
FIG. 2 is a flow chart illustrating an embodiment of a process to configured unified backup of a cluster suite.

FIG. 2 is a flow chart illustrating an embodiment of a process to configured unified backup of a cluster suite. In various embodiments, the process of FIG. 2 is performed by a backup server, such as backup server 110 of FIG. 1. In the example shown, an indication is received, e.g., via an administrative user interface, to configure a backup client (202). A virtual (or other) client name associated with a cluster suite is received, e.g., via a text input box comprising a graphical user interface (204). Physical nodes associated with the received virtual client name are auto-detected, e.g., by invoking an application programming interface (API) associated with a cluster technology or service used to provide the cluster suit, such as MSCS, or, in some embodiments, physical nodes may be indicated by manual user input (206). A specification of which save sets are to be included in the unified backup, e.g., which virtual and/or physical node save sets are to be included, is received (208). For example, save sets (e.g., volumes) on each virtual (e.g., CSV or other shared) node and each physical node may be auto-discovered and displayed in an administrative user interface configured to receive user input indicating which save sets are to be included in the unified cluster suite backup that is being configured. A unified backup of the cluster suite is configured to be performed, with each save set being indexed using a prefix that associates the save set with the virtual or physical node with which it is associated (210).

Figure 3:
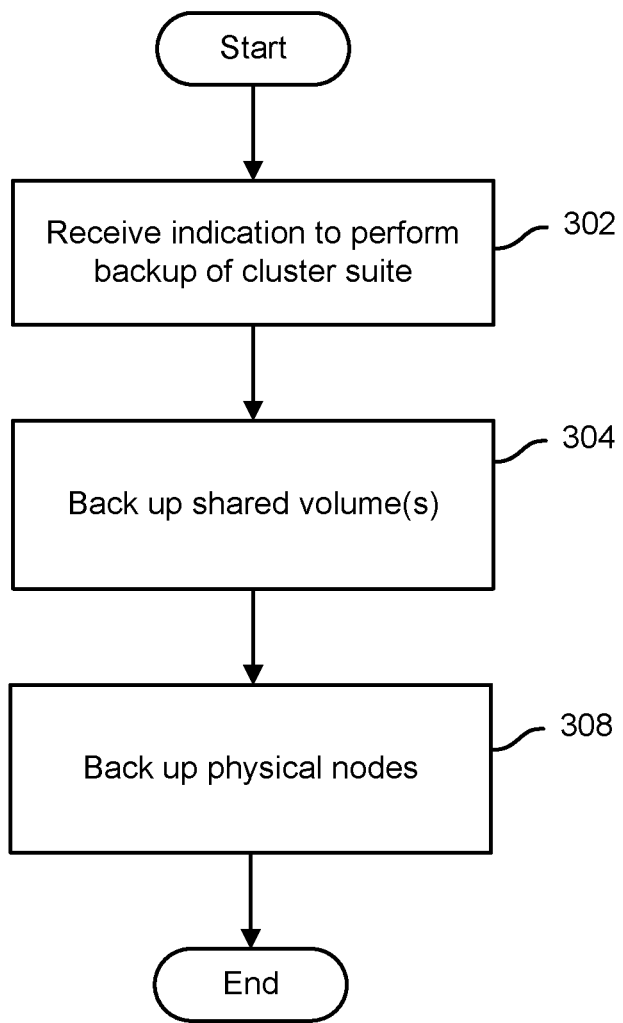
FIG. 3 is a flow chart illustrating an embodiment of a process to perform unified backup of a cluster suite.

FIG. 3 is a flow chart illustrating an embodiment of a process to perform unified backup of a cluster suite. In various embodiments, the process of FIG. 3 is performed by a backup server, such as backup server 110 of FIG. 1. In some embodiments, a unified backup according to the process of FIG. 3 may be performed based at least in part on a configuration data defined as described above in connection with FIG. 2. In the example shown in FIG. 3, an indication is received to perform a backup of a cluster suite (302). For example, a scheduled time to back up the cluster suite may have arrived. One or more shared volumes associated with the cluster suite are backed up (304). One or more volumes associated with physical nodes in the same cluster are backed up as part of the same unified backup operation as the shared volume(s) (308).

In various embodiments, each of the respective save sets backed up in an iteration of the process of FIG. 3 may be identified by a prefix or other data indicating a virtual or physical resource and/or node with which the save set is associated. Each save set may be indexed in a manner that preserves the prefix or other data and associates the save set with the virtual or physical node on which the source data was stored.

Figure 4:
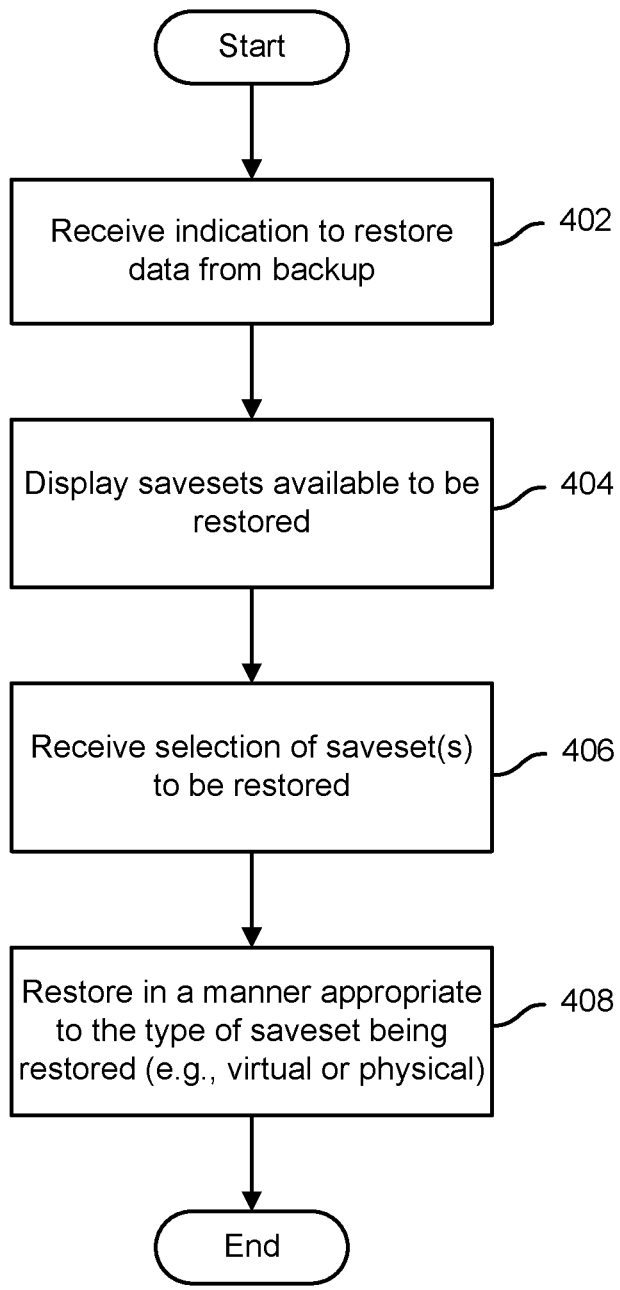
FIG. 4 is a flow chart illustrating an embodiment of a process to restore a save set associated with a cluster suite.

FIG. 4 is a flow chart illustrating an embodiment of a process to restore a save set associated with a cluster suite. In various embodiments, the process of FIG. 4 is performed by a backup server, such as backup server 110 of FIG. 1. In some embodiments, the process of FIG. 4 may be performed with respect to a save set backed up in an unified backup operation performed with respect to a cluster suite according to the process of FIG. 3. In the example shown in FIG. 4, an indication is received to restore from backup data associated with a cluster suite (402). Save sets available to be restored are displayed (404). For example, save sets associated with a cluster suite, identified for example using a virtual client name, may be determined and displayed in a data recovery user interface associated with backup server 110. In various embodiments, each save set may be identified, e.g., by a prefix or otherwise, in a manner that indicates which virtual or physical node/resource the save set is associated with. A selection of one or more save sets to be restored is received (406). For example, a save set may be selected via a data recover user interface. The selected save set(s) is/are restored, each in a manner that is appropriate to the type of save set that is being restored (e.g., virtual, physical, etc.) (408). For example, a virtual type save set may be restored to a cluster shared volume or other shared resource with which the save set is associated. In another example, a save set associated with a specific physical node, e.g., a specific cluster server, may be restored to that same physical node or, in some embodiments, to a physical recovery destination indicated by the user.

Figure 5A:
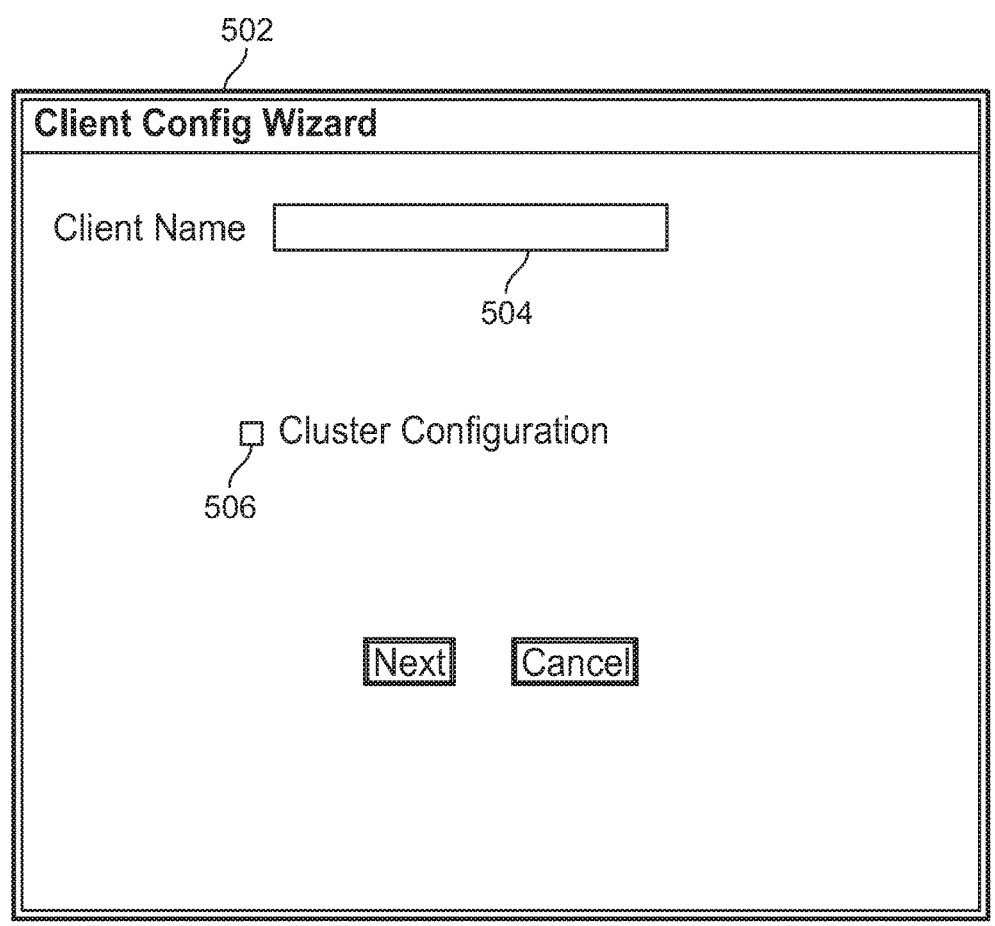
FIG. 5A is a block diagram illustrating an example of an administrative user interface to configure unified backup of a cluster suite in an embodiment of a backup system.

FIG. 5A is a block diagram illustrating an example of an administrative user interface to configure unified backup of a cluster suite in an embodiment of a backup system. In various embodiments, the user interface of FIG. 5A may be provided by a backup server, such as backup server 110 of FIG. 1. In the example shown, a client configuration wizard user interface 502 includes a client name entry field 504 in which a user may enter a virtual client name. If a "cluster configuration" check box 506 is selected, a subsequent screen is provided to enable cluster resources to be associated with the same backup client context that is being configured. In various embodiments, the backup system (e.g., backup server 110) is responsive to inputs provided via the client configuration wizard user interface 502 and following screens to perform a unified backup of a cluster suite as disclosed herein.

Figure 5B:
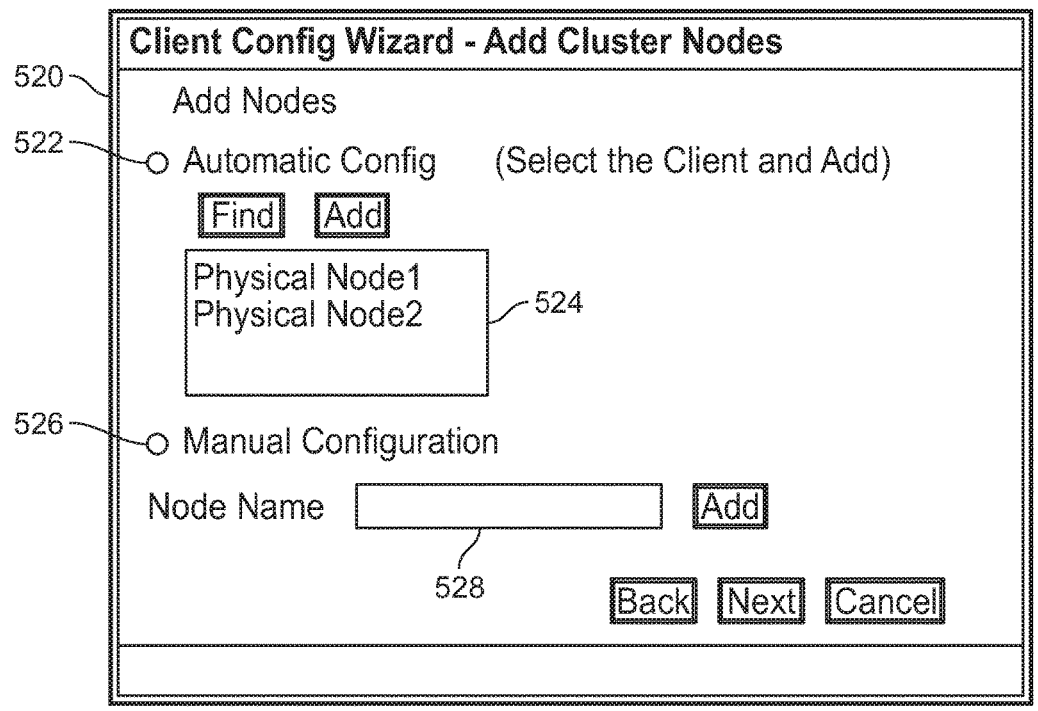
FIG. 5B is a block diagram illustrating an example of an administrative user interface to configure unified backup of a cluster suite in an embodiment of a backup system.

FIG. 5B is a block diagram illustrating an example of an administrative user interface to configure unified backup of a cluster suite in an embodiment of a backup system. In various embodiments, the user interface of FIG. 5B may be provided by a backup server, such as backup server 110 of FIG. 1. In the example shown, an "add cluster nodes" screen 520 of the client configuration wizard of FIG. 5A provides functionality to enable a user to associate cluster nodes with a backup client context that is being defined. In the example shown, the "add cluster nodes" screen 520 includes an "automatic configuration" radio button 522. In various embodiments, software code responsive to selection of "automatic configuration" radio button 522 invokes a cluster information API of a cluster suite with which the backup client configuration that is being defined is associated to detect automatically and display in a detected physical node display area 524 a list of physical nodes (e.g., cluster servers) that have been determined to be associated with the cluster. In the example shown, two physical nodes have been detected and listed in display area 524. The "add cluster nodes" screen 520 in this example also includes a "manual configuration" radio button 526. In various embodiments, selection of "manual configuration" radio button 526 enables a user to associated physical nodes with the cluster by entering the associated identifiers (e.g., IP or other addresses) in a manual node definition text entry box 528.

Figure 5C:
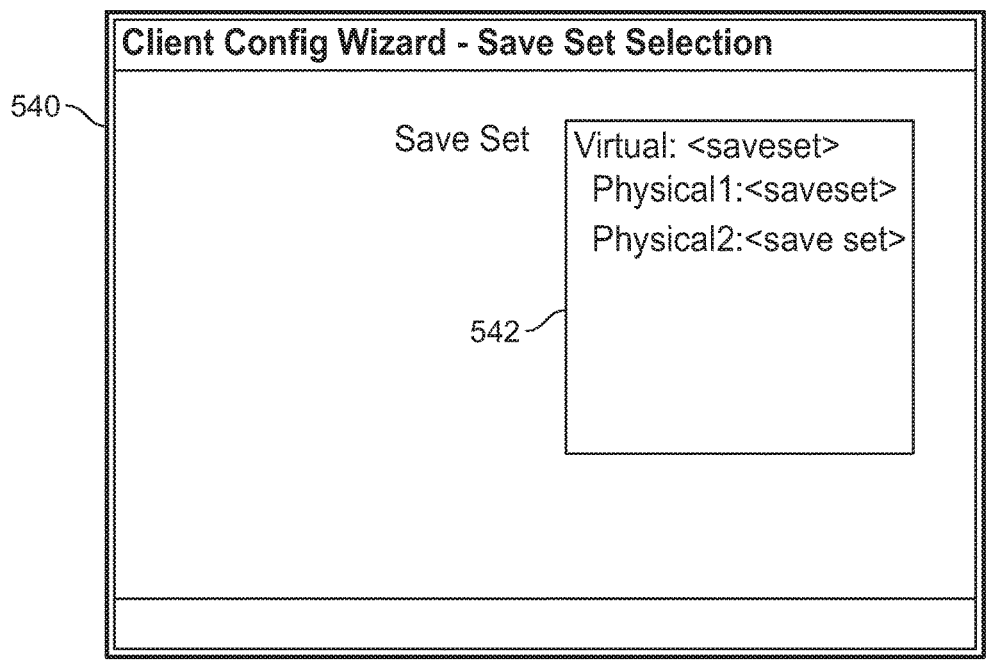
FIG. 5C is a block diagram illustrating an example of an administrative user interface to configure unified backup of a cluster suite in an embodiment of a backup system.

FIG. 5C is a block diagram illustrating an example of an administrative user interface to configure unified backup of a cluster suite in an embodiment of a backup system. In various embodiments, the user interface of FIG. 5C may be provided by a backup server, such as backup server 110 of FIG. 1. In the example shown, a "save set selection" screen 540 of the client configuration wizard of FIG. 5A enables a user to select save sets to be included in a unified cluster suite backup associated with the backup client context that is being defined. Auto-detected and/or previously defined save sets are displayed in a save set display and selection area 542 of save set selection screen 540. In various embodiments, selection of a save set as displayed in save set display and selection area 542, e.g., by double clicking or other input, results in the selected save set being include in the cluster suite unified backup that is being configured.

Figure 6:
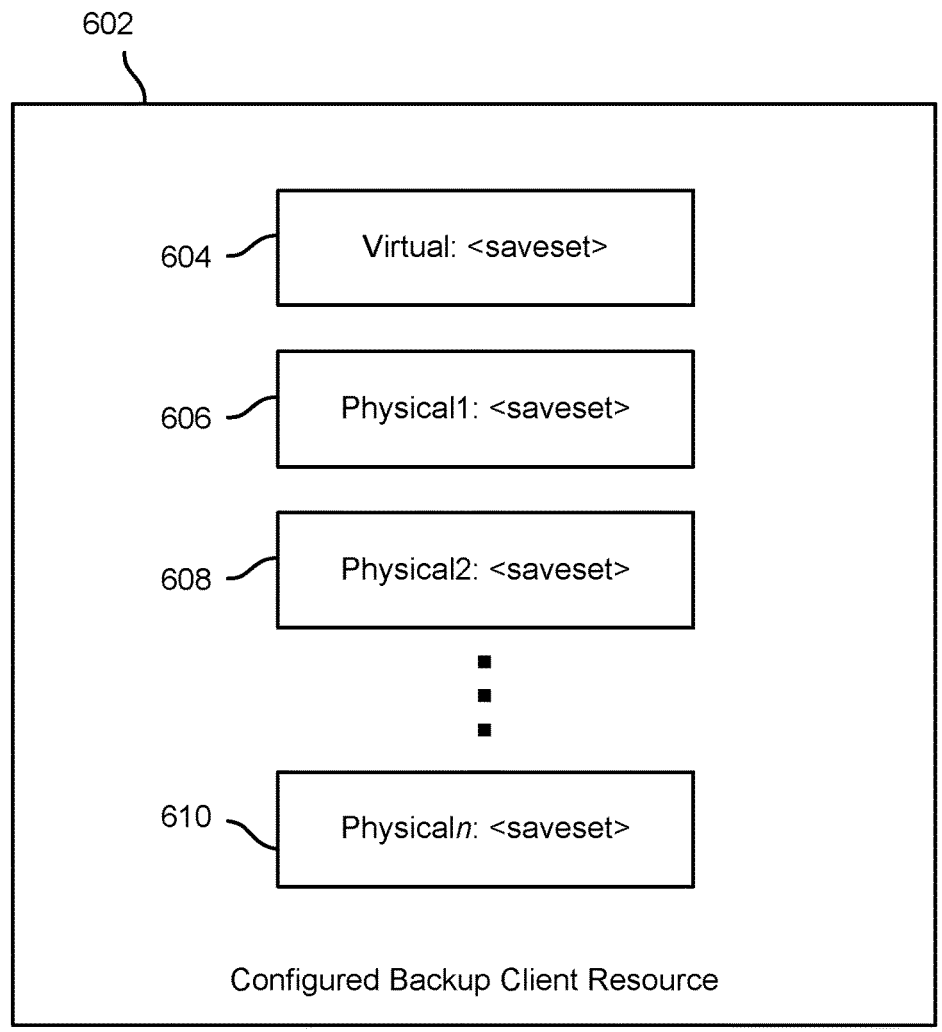
FIG. 6 is a block diagram illustrating an example of a configured client resource in an embodiment of a system to perform unified backup of a cluster suite.

FIG. 6 is a block diagram illustrating an example of a configured client resource in an embodiment of a system to perform unified backup of a cluster suite. In various embodiments, a backup client resource as illustrated in FIG. 6 may be define via a process such as the process of FIG. 2, and/or using a client configuration wizard or other administrative user interface, such as the client configuration wizard of FIGS. 5A-5C. In the example shown, configured backup client resource 602 includes a virtual-type save set 604 associated with a virtual/shared node or resource comprising the cluster suite, e.g., CSV 108 in the example shown in FIG. 1. In addition, configured backup client resource 602 includes a plurality of physical-type save sets, represented in FIG. 6 by save sets 606, 608, and 610, each of which is associated in this example with a different physical node associated with a cluster suite with which the configured backup client resource 602 is associated. In the examples shown, the prefixes, such as "virtual", "physical 1", etc., indicating the cluster resource and/or node with which the corresponding save set is associated. At backup time, the prefix information may be used to locate and back up the source data associated with that save set.

Techniques to back up virtual and physical resources and/or nodes comprising a cluster suite, in a single, unified backup operation, have been disclosed. In various embodiments, techniques disclosed herein may be used to back up data associated with a cluster suite in an efficient and coordinated manner that may use resources more efficiently, may enable cluster resources to be backed up in a shorter backup window, and avoids having data associated with a cluster be backed up potentially on different schedules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data associated with a cluster, comprising:
   receiving an indication to back up data associated with the cluster; and
   using a backup configuration data associated with the cluster to back up in a unified backup operation one or more save sets associated with virtual resources associated with the cluster and one or more saves sets associated with physical nodes associated with the cluster, including by storing each respective save set in a manner that associates the save set with a virtual or physical node comprising the cluster, wherein storing each respective save set in a manner that associates the save set with a virtual or physical node comprising the cluster includes associating each save set with a prefix or other ancillary data that indicates a cluster resource with which the save set is associated.

2. The method of claim 1, wherein the one or more save sets associated with virtual resources associated with the cluster comprises a cluster shared volume.

3. The method of claim 1, wherein the one or more saves sets associated with physical nodes associated with the cluster comprises a cluster server.

4. The method of claim 1, further comprising receiving a virtual backup client configuration data associated with the cluster.

5. The method of claim 4, further comprising auto-detecting one or more physical nodes comprising the cluster in connection with receiving said virtual backup client configuration data associated with the cluster.

6. The method of claim 1, further comprising using the prefix or other ancillary data to index the save set.

7. The method of claim 1, further comprising receiving an indication to restore a save set associated with the cluster.

8. The method of claim 7, further comprising displaying, in response to the received indication, a data restore user interface in which said one or more save sets associated with virtual resources associated with the cluster and said one or more saves sets associated with physical nodes associated with the cluster are represented.

9. A system to back up data associated with a cluster, comprising:
   a data storage device configured to store a backup configuration data associated with the cluster; and
   a processor coupled to the data storage device and configured to:
   receive an indication to back up data associated with the cluster; and
   use the backup configuration data associated with the cluster to back up in a unified backup operation one or more save sets associated with virtual resources associated with the cluster and one or more saves sets associated with physical nodes associated with the cluster, including by storing each respective save set in a manner that associates the save set with a virtual or physical node comprising the cluster, wherein storing each respective save set in a manner that associates the save set with a virtual or physical node comprising the cluster includes associating each save set with a prefix or other ancillary data that indicates a cluster resource with which the save set is associated.

10. The system of claim 9, wherein the one or more save sets associated with virtual resources associated with the cluster comprises a cluster shared volume.

11. The system of claim 9, wherein the one or more saves sets associated with physical nodes associated with the cluster comprises a cluster server.

12. The system of claim 9, wherein the processor is further configured to receive a virtual backup client configuration data associated with the cluster.

13. The system of claim 12, wherein the processor is further configured to auto-detect one or more physical nodes comprising the cluster in connection with receiving said virtual backup client configuration data associated with the cluster.

14. The system of claim 9, wherein the processor is further configured to use the prefix or other ancillary data to index the save set.

15. The system of claim 9, wherein the processor is further configured to receive an indication to restore a save set associated with the cluster.

16. The system of claim 15, wherein the processor is further configured to display, in response to the received indication, a data restore user interface in which said one or more save sets associated with virtual resources associated with the cluster and said one or more saves sets associated with physical nodes associated with the cluster are represented.

17. A computer program product to back up data associated with a cluster, the computer program product being embodied in a non-transitory computer readable storage medium and comprising computer instructions for:
receiving an indication to back up data associated with the cluster; and
using a backup configuration data associated with the cluster to back up in a unified backup operation one or more save sets associated with virtual resources associated with the cluster and one or more saves sets associated with physical nodes associated with the cluster, including by storing each respective save set in a manner that associates the save set with a virtual or physical node comprising the cluster, wherein storing each respective save set in a manner that associates the save set with a virtual or physical node comprising the cluster includes associating each save set with a prefix or other ancillary data that indicates a cluster resource with which the save set is associated.

* * * * *